US006792432B1

(12) United States Patent
Kodavalla et al.

(10) Patent No.: US 6,792,432 B1
(45) Date of Patent: Sep. 14, 2004

(54) DATABASE SYSTEM WITH METHODS PROVIDING HIGH-CONCURRENCY ACCESS IN B-TREE STRUCTURES

(75) Inventors: Hanuma Kodavalla, Union City, CA (US); Nagavamsi Ponnekanti, Emeryville, CA (US)

(73) Assignee: Sybase, Inc., Dublin, CA (US)

( * ) Notice: Subject to any disclaimer, the term of this patent is extended or adjusted under 35 U.S.C. 154(b) by 963 days.

(21) Appl. No.: 09/121,791

(22) Filed: Jul. 23, 1998

Related U.S. Application Data

(60) Provisional application No. 60/080,109, filed on Mar. 31, 1998.

(51) Int. Cl.[7] .............................................. G06F 17/30
(52) U.S. Cl. ........................... 707/103; 707/8; 707/101; 707/102; 707/201; 707/202
(58) Field of Search ................................ 707/1, 3, 101, 707/102, 200, 201, 204, 8, 103; 710/200

(56) References Cited

U.S. PATENT DOCUMENTS

| | | | |
|---|---|---|---|
| 4,606,002 A | | 8/1986 | Waisman et al. ............... 707/3 |
| 4,677,550 A | | 6/1987 | Ferguson ........................ 707/3 |
| 4,791,561 A | | 12/1988 | Huber ........................... 707/1 |
| 4,805,099 A | | 2/1989 | Huber ......................... 707/102 |
| 4,914,560 A | * | 4/1990 | Oh et al. .................... 363/56.1 |
| 4,947,320 A | | 8/1990 | Crus et al. .................. 707/201 |
| 5,089,952 A | | 2/1992 | Bozman ....................... 710/200 |
| 5,123,104 A | | 6/1992 | Levine et al. .................. 707/1 |
| 5,163,148 A | | 11/1992 | Walls ......................... 707/204 |
| 5,204,958 A | | 4/1993 | Cheng et al. ................ 707/102 |
| 5,265,244 A | | 11/1993 | Ghosh et al. ................... 707/1 |
| 5,430,869 A | | 7/1995 | Ishak et al. ................. 707/101 |
| 5,475,837 A | * | 12/1995 | Ishak et al. ................. 707/101 |
| 5,551,027 A | * | 8/1996 | Choy et al. .................. 707/201 |
| 5,568,638 A | * | 10/1996 | Hayashi et al. ................ 707/1 |
| 5,644,763 A | * | 7/1997 | Roy ........................... 707/101 |
| 5,717,921 A | * | 2/1998 | Lomet et al. ............... 707/100 |
| 5,752,243 A | * | 5/1998 | Reiter et al. .................... 707/3 |
| 5,758,356 A | * | 5/1998 | Hara et al. ................... 707/202 |
| 5,806,065 A | * | 9/1998 | Lomet ........................... 707/8 |
| 5,940,841 A | * | 8/1999 | Schmuck et al. ........... 707/205 |
| 6,173,277 B1 | * | 1/2001 | Ashby et al. ................... 707/1 |

* cited by examiner

*Primary Examiner*—Thuy Pardo
(74) *Attorney, Agent, or Firm*—John A. Smart

(57) ABSTRACT

A Client/Server Database System with improved methods for providing access to highly-concurrent data, such as of B-Tree data structures, is described. When the system receives a request to insert a key value into a B-Tree at page that does not have sufficient room, the system must split at the tree at the leaf level. This is done by allocating a new page, and moving some of the key values from the old page to the new page. The split itself propagates upward. To do the split itself, the system obtains address locks for the two pages, and marks both as undergoing "split" (i.e., a split operation)—the system sets a Boolean flag or "split bit" to "true." When the split is propagated up, a "side entry" is added to the old page to point to the newly allocated page. The old page, however, may not have sufficient room for storing this new entry (e.g., when it is already full). Accordingly in such a case, the parent page must split also. This is done by allocating a new page, at that level. Both pages, old and new parents, are marked as undergoing split. As before, the system obtains address locks for these pages as well. At this point, a side entry is created in the old parent page. This information serves to let any client which is searching for key value (or greater) know that, instead of going directly down the tree from the old parent page, it should proceed to the parent's new neighboring page. In this manner, a client's traversal down the tree is not blocked by the split which is currently active. In effect, the client knows how to take a detour to arrive ultimately at the proper leaf-level page. After split propagation is complete, the system clears the split flags and releases address locks. Also at this point, the side entry is removed. Now, sufficient room now exists in the tree for inserting the key value.

30 Claims, 14 Drawing Sheets

EXAMPLE OF A LEAF PAGE SPLIT

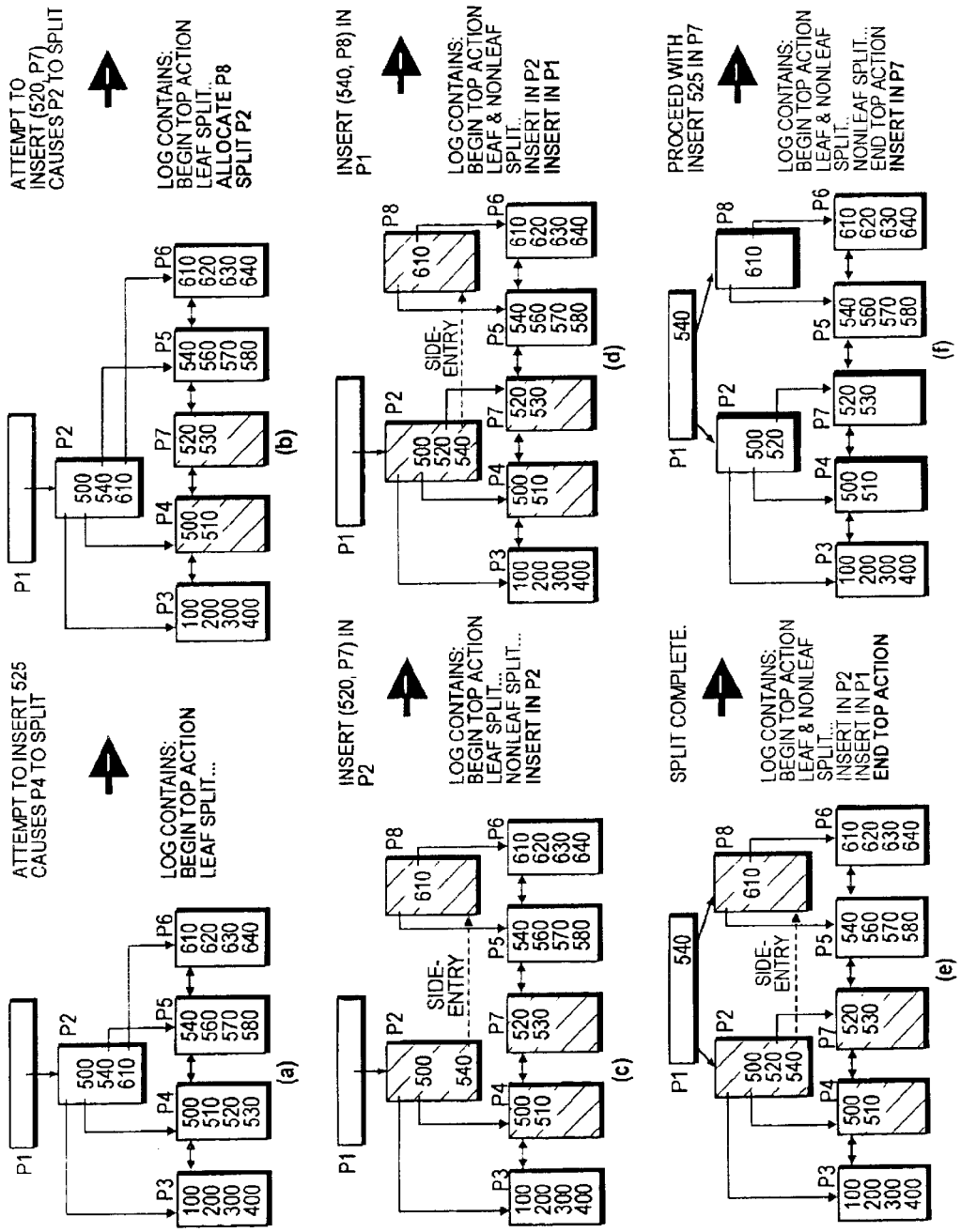
FIG. 7 EXAMPLE OF A NONLEAF PAGE SPLIT

EXAMPLE OF A ROOT PAGE SPLIT

DATABASE SYSTEM WITH METHODS PROVIDING HIGH-CONCURRENCY ACCESS IN B-TREE STRUCTURES

RELATED APPLICATIONS

The present application claims the benefit of priority of commonly-owned provisional application serial No. 60/080,109, filed Mar. 31, 1998, and entitled, Database System with Methods Providing High-Concurrency Access in B-Tree Structures, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to concurrent access and maintenance of concurrent data structures in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers. Both Powersoft™ and Sybase Adaptive Server™ (formerly Sybase SQL Server™) are available from Sybase, Inc. of Emeryville, Calif.

To support multiple clients concurrently accessing data, a database system must employ some sort of concurrency control. Concurrency control is the way that a database synchronizes clients' or users' access to data to ensure that they do not destroy each other's work. Locking is the way that most databases handle concurrency control. While one user has a lock on a subset of the database, that data is protected from other users' attempts to make changes to it. One user's changes have to be "committed" before another user can see or further change the same data.

One of the characteristics of a locking scheme is the level of the locks. Some products default to physical storage page-level locks and while others default to logical row-level locks. Some products allow the user to specify which level of locking (page, row, or table) will be used for an individual table. Another of the characteristics of a locking scheme is the lock type, whether dynamic or static. A static locking scheme sets up one level of locking for each table in the database, often at table creation time or via database defaults. Dynamic locking attempts to optimize the granularity of locks depending on the particular change being made. A dynamic locking scheme will automatically increase the granularity of locks from row to page to table level when a certain threshold is met in the more fine-grained locks. The goal is to use the least amount of system overhead per lock while getting as many users safely into the database as possible. The usual approach is to start with a higher level lock, then reduce its granularity only when there is contention from another transaction that wants to lock the same page or table for an UPDATE, DELETE, INSERT, or SELECT. This minimizes the total number of locks. The other approach of initially using a lower granularity and escalating it when a threshold level is reached has problems. For example, escalation from row-level to page-level locks can cause deadlocks when two transactions attempt to acquire page-level locks on the same page at the same time.

Page-level locking is problematic for highly concurrent data structures whose structures must be maintained, such as B-tree data structures. Conventionally, when two different transactions are attempting to insert into the same B-tree page, for instance, the underlying system employs transaction durational page-level locks, so that the two competing inserts would be serialized. If enough room does not exist for the inserts, the page is split. A split in one part of the tree does not occur in isolation but propagates to its parent. Often, the split is done as a separate action—a "nested top" action—within the transaction. After the split is completed, the system continues with the current transaction. If two transactions are trying to perform splits at different locations in the B-tree in a conventional system, the transactions are serialized, as a conventional system only allows one top action at a time. The process of serializing page splits leads to much contention among the multiple transactions concurrently executing within the system.

Each day more and more businesses are run from mission-critical systems which store information on server-based SQL database systems, such as Sybase Adaptive Server™. As a result, increasingly higher demands are being placed on server-based SQL database systems to provide enterprise-wide decision support. Accordingly, there is much interest in improving the performance of such system, particularly in terms of execution speed and reliability.

SUMMARY OF THE INVENTION

The present invention comprises a Client/Server Database System with improved methods for providing access to highly-concurrent data structures, such as B-Trees. In an exemplary embodiment, the system includes one or more Clients (e.g., Terminals or PCs) connected via a Network to a Server. The Server, operating under a server operating system (e.g., UNIX) includes a Database Server System, such as Sybase Adaptive Server. In general operation, Clients store data in and retrieve data from one or more database tables resident on the Server. Each table itself comprises one or more horizontal rows or records divided into columns or fields of information. For enhancing the speed in which the Database Server stores, retrieves, and processes particular data records, the Server maintains one or more database indexes on each table. A database index, which in an exemplary embodiment is maintained as a B-Tree data structure, allows the records of a table to be organized in many different ways, depending on a particular user's needs, with the speed of retrieving any particular data record significantly improved.

Methodology is provided which affords high-concurrency access to B-tree structures. When the system receives a request to insert a key value into a B-Tree at page that does not have sufficient room, the system must split at the tree at leaf level. This is done by allocating a new page, and moving some of the key values from the old page to the new page. The split itself propagates upward. To do the split itself, the system obtains address locks for the two pages, and marks both as undergoing "split" (i.e., a split operation). Referring back to the previously described data structures, the system would add the address locks to be linked list of address locks, maintained by SDES. Further, for the B-tree pages themselves, the system sets a Boolean flag or "split bit" to "true."

When the split is propagated up, a "side entry" is added to the old page to point to the newly allocated page. The old page, however, may not have sufficient room for storing this new entry (e.g., when it is already full). Accordingly, the parent page must split also. This is done by allocating a new page, at that level. Both pages, old and new parents, are marked as undergoing split. As before, the system obtains address locks for these pages as well. At this point, a side entry is created in the old parent page. This information serves to let any client which is searching for key value (or greater) know that, instead of going directly down the tree from the old parent page, it should proceed to the parent's new sibling node or page. Note in particular that the traversal is not blocked by the split which is currently active. In effect, the client knows how to take a detour to arrive at the proper leaf-level page. Similarly, if the client is searching for a lesser key value, it will traverse to the proper page, without being blocked. Again, even though the page is undergoing a split, the client is not blocked from accessing the sought-after key value. After split propagation is complete, the system clears the split flags and releases address locks. Also at this point, the side entry is removed. Now, sufficient room now exists in the tree for inserting the key value.

BRIEF DESCRIPTION OF THE DRAWINGS

FIG. 7 is block diagram which highlights method steps involved in a non-leaf page split, as opposed to a leaf page split.

DETAILED DESCRIPTION OF A PREFERRED EMBODIMENT

The following description will focus on the presently preferred embodiment of the present invention, which is operative in a network environment executing client/server database applications. The present invention, however, is not limited to any particular application or environment. Instead, those skilled in the art will find that the present invention may be advantageously applied to any application or environment where optimization of access to highly-concurrent data structures is desirable, including in non-SQL database management environments. The description of the exemplary embodiments which follows is, therefore, for the purpose of illustration and not limitation.

Standalone System Hardware

Figure 1A:
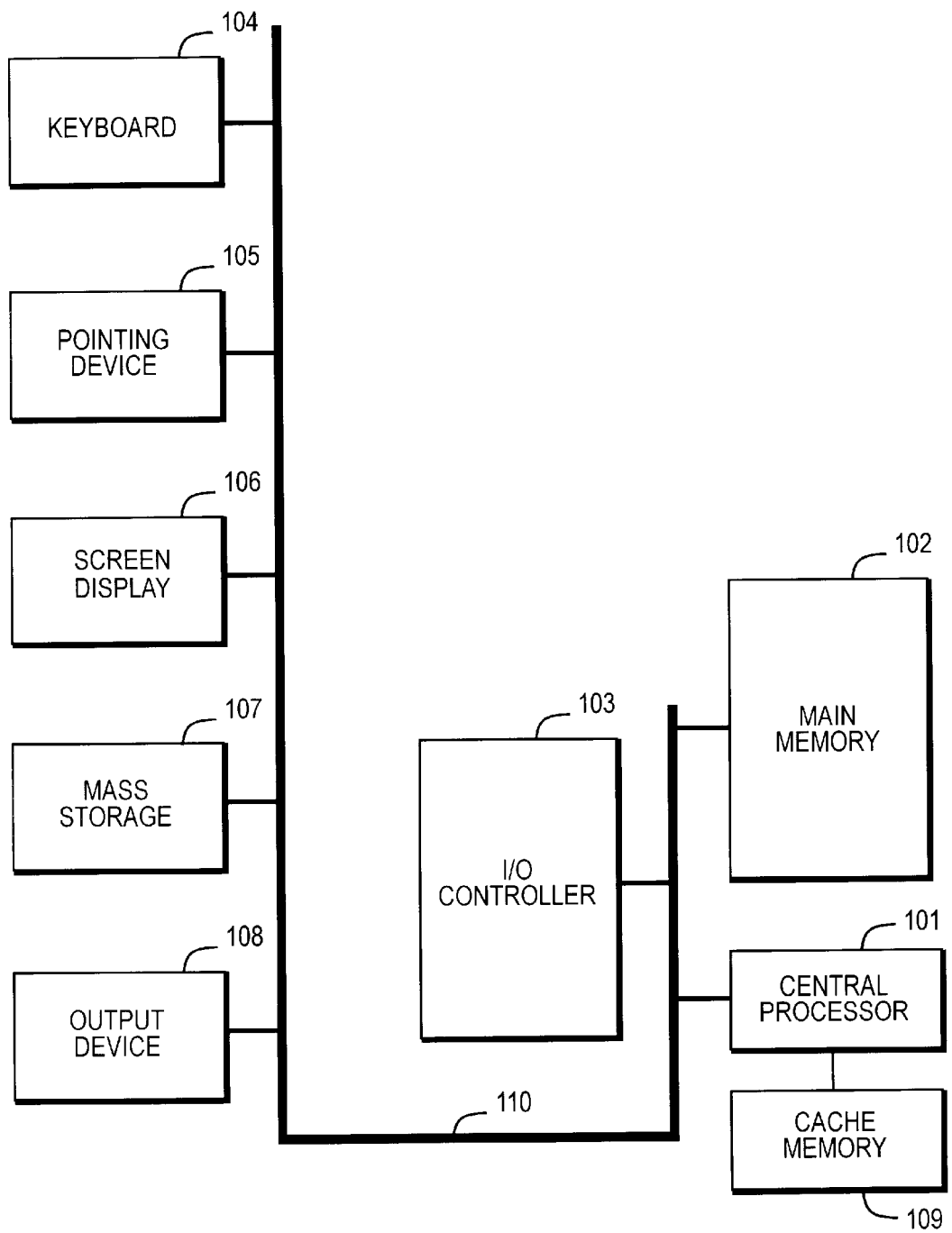
FIG. 1A is a block diagram illustrating a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a screen display device 106, and a mass storage 107 (e.g., hard or fixed disk, removable disk, optical disk, magneto-optical disk, or flash memory). Processor 101 includes or is coupled to a cache memory 109 for storing frequently accessed information; memory 109 may be an on-chip cache or external cache (as shown). Additional output device(s) 108, such as a printing device, may be included in the system 100 as desired. As shown, the various components of the system 100 communicate through a system bus 110 or similar architecture. In a preferred embodiment, the system 100 includes an IBM-compatible personal computer system, available from a variety of vendors (including IBM of Armonk, N.Y.).

Standalone System Software

Figure 1B:
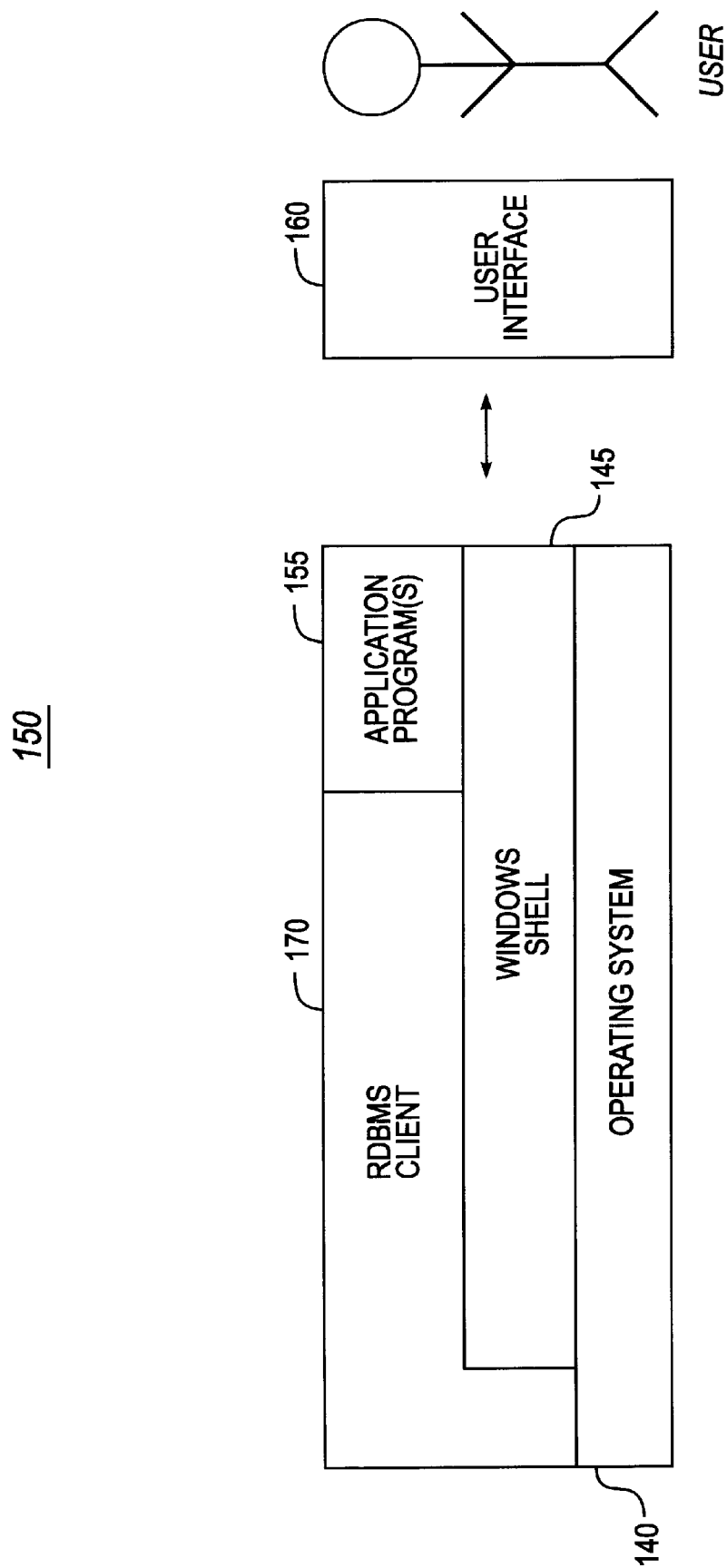
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on mass storage or disk memory 107, includes a kernel or operating system (OS) 140 and a windows shell 145. One or more application programs, such as application software 155, may be "loaded" (i.e., transferred from storage 107 into memory 102) for execution by the system 100. The system also includes a user interface 160 for receiving user commands and data as input and displaying result data as output.

Also shown, the software system 150 includes a Relational Database Management System (RDBMS) front-end or "client" 170. The RDBMS client 170 may be any one of a number of database front-ends, including PowerBuilt™, dBASE®, Paradox®, Microsoft® Access, or the like. In an exemplary embodiment, the front-end will include SQL access drivers (e.g., Borland SQL Links, Microsoft ODBC drivers, Intersolv ODBC drivers, and the like) for accessing SQL database server tables in a Client/Server environment.

Client/Server Database Management System

Figure 2A:
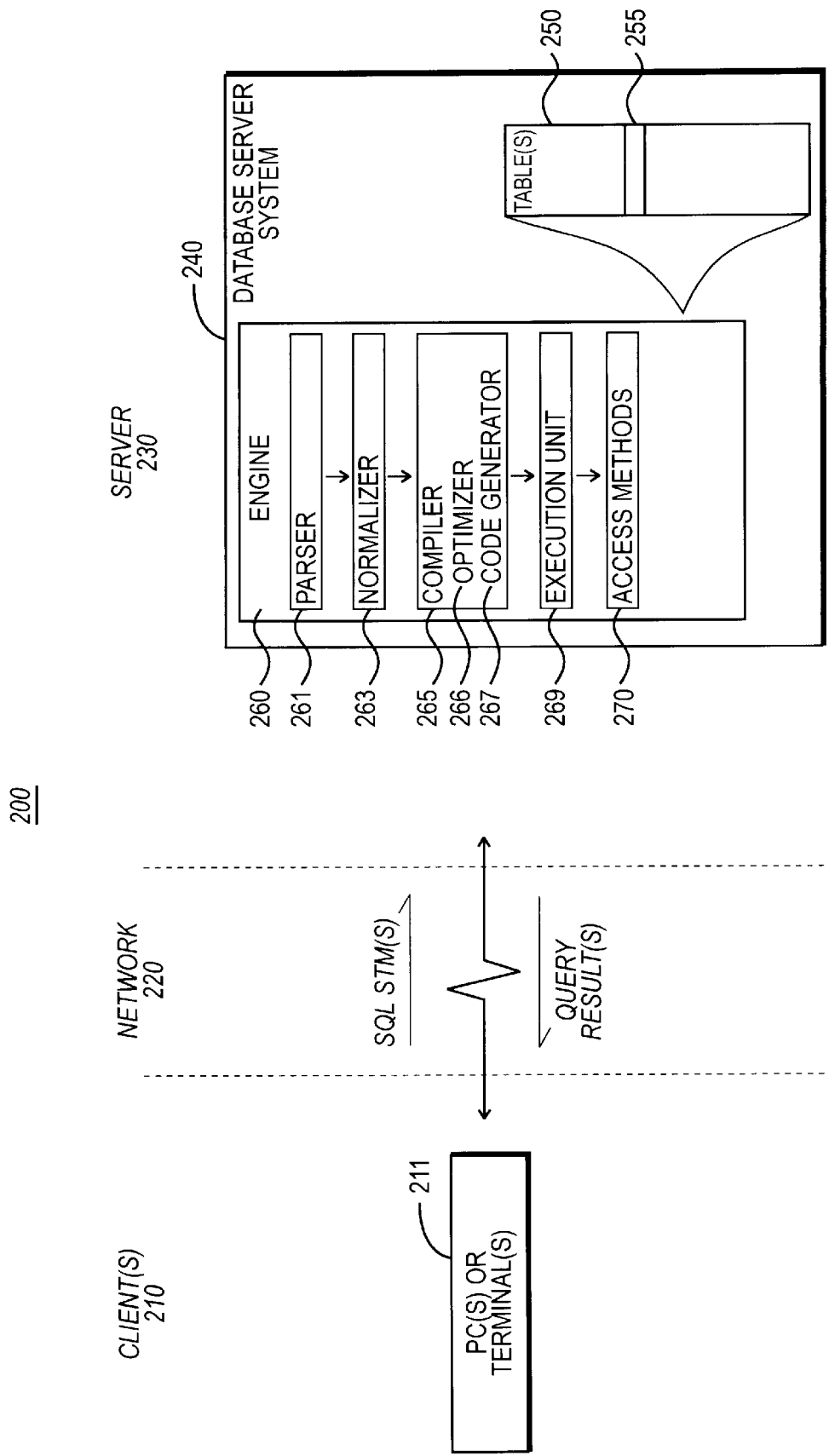
FIG. 2A is a block diagram of a client/server system in which the present invention is preferably embodied.

While the present invention may operate within a single (standalone) computer (e.g., system 100 of FIG. 1A), the present invention is preferably embodied in a multi-user computer system, such as a Client/Server system. FIG. 2A illustrates the general structure of a Client/Server Database System 200 suitable for implementing the present invention. As shown, the system 200 comprises one or more Client(s) 210 connected to a Server 230 via a Network 220. Specifically, the Client(s) 210 comprise one or more standalone Terminals 211 connected to a Database Server System 240 using a conventional network. In an exemplary embodiment, the Terminals 211 may themselves comprise a plurality of standalone workstations, dumb terminals, or the like, or comprise personal computers (PCs) such as the above-described system 100. Typically, such units would operate under a client operating system, such as Microsoft Windows/MS-DOS for PC clients.

The Database Server System 240, which comprises Sybase SQL Server™ (available from Sybase, Inc. of Emeryville, Calif.) in an exemplary embodiment, generally operates as an independent process (i.e., independently of the clients), running under a server operating system such as Microsoft Windows NT (Microsoft Corp. of Redmond, Wash.), NetWare (Novell of Provo, Utah), or UNIX (Novell). The Network 220 may be any one of a number of conventional network systems, including a Local Area Network (LAN) or Wide Area Network (WAN), as is known in the art (e.g., using Ethernet, IBM Token Ring, or the like). The Network includes functionality for packaging client calls in the well-known SQL (Structured Query Language) together with any parameter information into a format (of one or more packets) suitable for transmission across a cable or wire, for delivery to the Database Server 240.

Client/server environments, database servers, and networks are well documented in the technical, trade, and patent literature. For a discussion of database servers and client/server environments generally and Sybase Adaptive Server™ particularly, see, e.g., Nath, A., *The Guide to SQL Server*, Second Edition, Addison-Wesley Publishing Company, 1995. Additional documentation of Adaptive Server™ is available from Sybase, Inc. as *Adaptive Server Enterprise 11.5 Documentation* (currently available at http://sybooks.sybase.com/cgi-bin/nph-dynaweb/asg1150e). Documentation for Sybase SQL™ Server 11.0.x is available from Sybase, Inc. as *Sybase SQL Server 11.0.x Collection* (currently available at http://sybooks.sybase.com/cgi-bin/nph-dynaweb/asg1100e) For a discussion of a computer network employing Microsoft Networks/OpenNet File Sharing Protocol, see Method and System for Opportunistic Locking in a Networked Computer System, Intl. Application No. PCT/US90/04570, Intl. Publication No. WO 91/03024, Intl. Publication Date Mar. 7, 1991. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. The disclosures of each of the foregoing are hereby incorporated by reference.

In operation, the Client(s) 210 store data in or retrieve data from one or more database tables 250, shown in FIG. 2. Typically resident on the Server 230, each table itself comprises one or more horizontal rows or "records" (tuples) together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

In operation, the Clients issue one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned An Introduction to Database Systems. In addition to retrieving the data from Database Server tables, the Clients also include the ability to insert new rows of data records into the table; Clients can also modify and/or delete existing records in the table.

For enhancing the speed in which the Database Server stores, retrieves, and presents particular data records, the Server maintains one or more database indexes on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

In operation, the SQL statements received from the one or more Clients 210 (via network 220) are processed by Engine 260 of the Database Server System 240. The Engine 260 itself comprises a Parser 261, Normalizer 263, Compiler 265, Execution Unit 269, and Access Methods 270. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator, on the other hand, converts the query tree into a set of instructions suitable for satisfying the query. These instructions are passed to the Execution Unit 269. Operating under the control of these instructions, the Execution Unit 269 generates calls into lower-level routines, such as the Access Methods 270, for retrieving relevant information (e.g., row 255) from the database table 250. After the plan has been executed by the Execution Unit, the Server returns a query result or answer table back to the Client(s).

For enhancing the speed in which the Database Server stores, retrieves, and processes particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file.

As clients insert more and more data into the table 250, the index 245 continues to grow. Two parts of the Database Server System 240 play a central role in the processing and maintenance of the index: Access Methods 241 and Page Manager 243. Of particular interest, the Access Methods include an index manager module which can be viewed as comprising two submodules: B-tree insert and B-tree search. The B-tree search submodule functions to find a particular key value in a tree. All B-tree operations can be viewed as starting with a B-tree search, starting from the root node or page of the B-tree. The B-tree insert submodule serves to insert a new entry into a B-tree. Both employ a B-tree traverse module to traverse a tree. Once the leaf level is reached, if enough space does not exist (e.g., for insertion), then the B-tree split module is invoked for splitting a B-tree page. The splits propagate bottom up; traversal operations, on the other hand, proceed from top to bottom. It is important, therefore, to ensure that the two processes do not deadlock.

Indexes and B-Trees

A. B-Trees

Figure 2B:
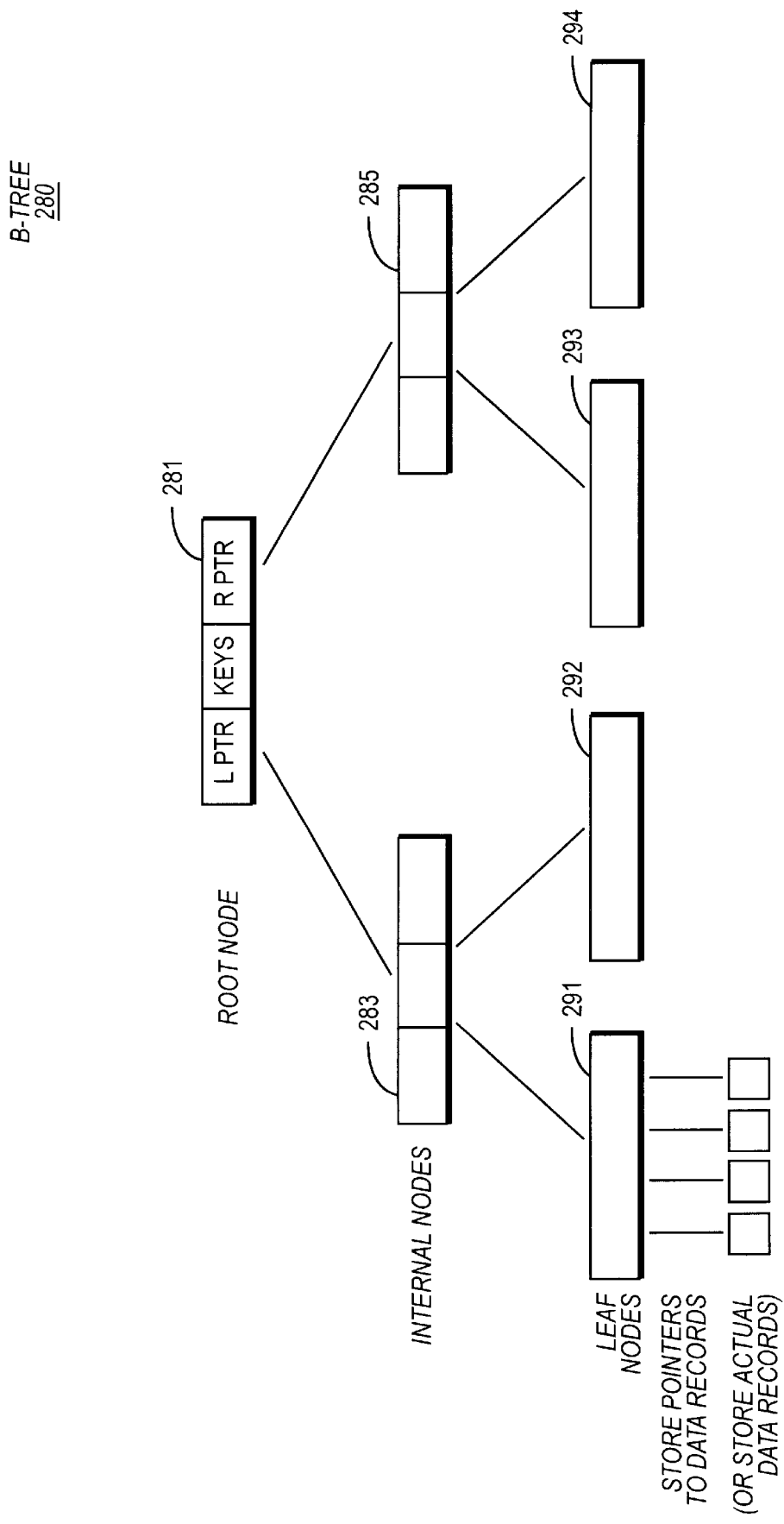
FIG. 2B is a block diagram illustrating general structure of a B-Tree.

B-Trees are fundamental to the maintenance of indexes. FIG. 2B illustrates a simple B-Tree 280, which comprises a Root Node 281, Internal Nodes 283, 285, and Leaf (terminal) Nodes 291, 292, 293, 294. As shown, therefore, a B-Tree consists of a plurality of nodes arranged in a tree. Each node may, in turn, be thought of as a block of records. As shown by the Root Node 281, each node stores one or more key values ("keys") together with pointers to children nodes (e.g., Nodes 283, 285 for Root Node 281).

Searching for a particular record in the B-Tree occurs by traversing a particular path in the tree. To find a record with a particular key value, one would maneuver through the tree comparing key values stored at each node visited with the key value sought. The results of each comparison operation, in conjunction with the pointers stored with each node, indicate which path to take through the tree to reach the record ultimately desired. Ultimately, a search will end at a particular leaf node, such as leaf node 291. The leaf node will, in turn, point to (i.e., store a pointer to or identifier for) a particular data record for the key value sought. Alternatively, the leaf nodes may for "clustered indexes" store the actual data of the data records on the leaf nodes themselves.

In contrast to the B-Tree approach, a sequential or linear scan from the beginning of a database table, comparing each record along the way, is exceedingly slow. There, all of the blocks of records would have to be visited until the record sought is finally located. For a table of even moderate size, such an approach yields unacceptable performance. As a result, virtually all modern-day relational database systems employ B-Tree indexes or a variant.

General techniques for the construction and operation of B-Trees are well documented in the technical, trade, and patent literature. For a general description, see Sedgewick, R., *Algorithms in C*, Addison-Wesley, 1990. For a survey of various B-Tree implementations, see Comer, D., *The Ubiquitous B-Tree*, Computing Surveys, Vol. 11, No. 2, June 1979, pp. 121–137. For a description of B-Tree indexes implemented in a PC DBMS system, see Baker, M., *B-tree indexing: A look at indexing tradeoffs in dBASE, Clipper, and FoxPro*, Programmer's Journal, Vol. 8.6, November/December 1990, pp. 42–46. Also, see System and Methods for Information Retrieval, International Application No. PCT/US91/07260, International Publication No. WO 92/06440, Apr. 16, 1992, which describes B-Tree indexes for Fox® PC DBMS software. Multiple index files, including dBASE's .mdx files, have also been described in the technical literature; see e.g., Freeland, R., *Exploring MDXs*, Data Based Advisor, February 1991, pp. 85–87. The disclosures of each of the foregoing references are hereby incorporated by reference.

B. B-Tree maintenance

Maintenance of B-Trees is fundamental to the operation of indexes in a relational database system. As new data records are loaded in a database table, the index (and corresponding in-memory B-Tree) for that table grows, to accommodate the new records. As a new record is added to a table, a corresponding index entry (typically, index key value plus record identifier) is added to an appropriate slot in the appropriate B-Tree node (i.e., the node which is appropriate for the key value expressed by the record). Since each node of the B-Tree has a fixed size (generally, limited by the size of the database page employed), when an update operation occurs which exceeds the capacity of a particular node, an "overflow" condition exists at the node.

The conventional approach to handling node overflow is generally to split the particular node into equal parts—that is, "down the middle"—for storing the new information (i.e., for storing the additional key value/record identifier for the new data record which is being inserted). Instances where the data record to be inserted (i.e., "insert row") belongs at the end of a page (or node) are treated as a special case, however. In those instances, the conventional approach is to split the page at its end, rather than its middle; this optimizes sequential/batch loading of data which is in sorted order. For data insert operations which are random, the conventional approach yields good, if not optimal, results. An improved approach to handling node overflow which splits the particular node at the point of insertion is described in commonly-owned application Ser. No. 08/497,663, filed Jun. 28, 1995, now U.S. Pat. No. 5,644,763, the disclosure of which is hereby incorporated by reference.

Of particular interest to the present invention is the optimization of database system performance by improving access of highly-concurrent data structures, such as B-Trees, in the presence of one or more transactions. Modification of the Engine 260, particularly operation of the index manager, for achieving this optimization will now be described in further detail. In particular, the following description will focus on how the system provides high concurrency when other transactions occur and need access to shared data structures, such as B-tree data structures.

Improved Access to High-Concurrency Data Structures

A. Introduction

As previously described, page-level locking is problematic for highly-concurrent data structures such as a B-Tree whose structural consistency must be maintained. Even in systems that support row-level locking, multiple transactions performing page splits in different parts of the B-tree may not be allowed. For example, in ARIES/IM (see, e.g., C. Mohan and Frank Levine. *ARIES/IM: An Efficient and High Concurrency Index Management Using Write-Ahead Logging*, Proc. ACM SIGMOD International Conference on Management of Data, San Diego, June 1992, the disclosure of which is hereby incorporated by reference), a page split acquires an exclusive latch on the entire tree and prevents other transactions from doing splits anywhere in the tree. Even though the tree latch is not held until the end of the transaction, it is held until the split propagation is complete. In the system of the present invention, such a limitation is not present: two transactions can concurrently perform splits as long as they are splitting different pages. The present invention makes sure that tree traversals reach the appropriate leaf page even if the pages in the path from the root to the leaf are undergoing split.

B. Synchronization Mechanisms

1. Latches

The new index manager uses the following synchronization mechanisms, each for a different purpose. "Latches" are used to guarantee physical consistency of pages. For example, a transaction modifying a page holds an exclusive (EX) latch on the page, while a transaction reading a page holds a share (SH) latch; the reader is protected from seeing a physically inconsistent page. Latches are held for a short-duration (typically for the duration of page search or page modification); they are not held for the duration of the transaction. Latches are held only on kept pages, with the latch information is kept in the buffer header of the corresponding page. By keeping the information in the buffer header, the system can perform latching and unlatching more efficiently than locking and unlocking. In no-contention case, latching is approximately ten times faster than locking. Since there is no deadlock detection performed on latches in a preferred embodiment, they must be acquired in a predetermined order and/or no-wait mode.

2. Logical Locks

Logical locks are acquired on data rows, data pages, or the table to guarantee logical consistency. The duration of these locks depends on the mode of the operation (read or modify) and the transaction's isolation level. Logical locks can be acquired in conditional or unconditional mode. In particular, while holding a latch, only a conditional lock request is made, thereby ensuring that locks and latches do not get into deadlocks.

3. Address Locks

The index manager does not use address locks for tree traversal; instead, latches are used. However, the new index manager uses address locks for a special purpose: to serialize split and shrink operations on a page. These locks are held for the duration of the split or the shrink operation and not for the duration of the transaction. If a transaction must wait for a split to complete, the transaction waits on the address lock of that page. Address locks can be acquired in share or exclusive mode. Both conditional and unconditional address locks are requested. These address locks are also called split or shrink locks.

The database system employs a session descriptor, SDES, to store essentially all information relevant to the current session, either directly (i.e., stored within the data structure itself) or indirectly (i.e., via pointers stored within the SDES structure). The session descriptor stores, for instance, information about a particular table, including a table descriptor and a table handle for the table. The session descriptor also includes, for example, information about access rights to a particular table. In the SDES data structure, the system keeps track of which pages hold address locks. The system maintains this information in SDES as a link list of address locks. An address lock is released when the top action completes, that is, when the split is propagated completely.

4. Split, Shrink and Side-entry bits

Before a transaction inserts an entry into a leaf page, the transaction must check if the page is undergoing split. If so, the transaction must wait by waiting for the split lock on the page. Since insert is a very common operation, and split is a relatively infrequent operation, inserts requesting address lock for every operation is expensive. To reduce that overhead, the system uses status bits in the page header to indicate if the page is undergoing split or shrink. Thus, transactions need to get address locks only if the split or shrink bit is set.

The header in each of the leaf and non-leaf pages contains the following two bits:

Split bit: If set, the page may be undergoing a split.
Shrink bit: If set, the page may be undergoing a shrink.

It is never the case that both bits are set on a page. These bits are set by a split or a shrink while holding an exclusive latch on the page, but they may be cleared by the split or the shrink without acquiring a latch. The bits are tested while holding a share or exclusive latch.

When a non-leaf page is traversed, if it is undergoing split, it might be the case that the traversal should go to the new page rather than continue from the old page. A "side-entry" bit is set in the old page to indicate whether there is a side entry in the page. If one exists, then the search key is compared with the side-entry to check if the traversal must go to the new page. This bit is cleared after the split is complete. The split bit may be on without the side-entry bit being on, for instance when the new page resulting from a split does not have the side-entry bit on. In the old page, the side-entry bit is turned on after performing the split, whereas the split bit is turned on before performing the split. This is because the side-entry is formed only after splitting the page and moving the contents. The side-entry bit exists in the leaf page also. In those pages, the next page pointer is the side-entry. Unlike in non-leaf pages, there is no explicit side-entry in the body of the leaf page.

5C. INSERT operation

The B-Tree module provides an Application Programming Interface (API) call, bt_insert, for the data layer to insert an index row into the tree.

```
/*
**
**
**
**    BT_INSERT
**    Inserts an index row (nonduplicate leaf row format) into the btree of
**    data-only locked table.
**       Parameters:
**       sdes -    (inout) session descriptot
**       indptr    - (in) sysindexes row pointer
**       rowptr    - (inout) index row pointer
**       rowlen    - (in) index row length
**
**
**    Returns:
**       0          - successfully inserted
**       failure, EX~NUNBRR(INSRTh, <error-minor-number>) or its inverse.
**       Return < 0 indicates "don't print error".
**       -EX_NUMBER(INSRTM, IALLOCFAIL) - page allocation failed
**       -Ex_NUNBER(INSRTh, ERXIT) - failed, sdes->sridoff has error code
**
**
**    sdes->sridoff error codes:
**       DEADLOCK       - while insert is waiting for next-key lock,
**          or a deleted key (uniqueness check)
**    OUTOFSPACE- index or log segment ran out of space
**       ABRT_CMD    - abort command because of duplicate key
**       DUPK_IGNORED       - this is set after calling
**          abortmark( ) which would have rolled
**          back up to the beginning of the data
**          row insert.
**
**
**    Side effects:
**    May do a split.
**    Index row's rid Status bits may be changed by this function.
**
**
**    Assumptions:
**    1. Caller must not be holding any latches.
**    2. Caller must have EX locked the data row.
*/
```

The Btree module also provides an API call, bt_delete( ), for the data layer to delete an index row from the tree.

```
/*
**
**    BT_DELETE
**    Deletes an index leaf row from the btree of data-only locked table.
**
**    Parameters:
**       sdes-              (inout) session descriptor
**       indptr-            (in) sysindexes row pointer
**       rowptr-            (inout) index row pointer
**       rowlen-            (in) index row length
**
**    Returns:
**    TRUE    - successfully deleted the row
**    FALSE   - some error occurred. sdes->sridoff has error code.
**       sdes->sridoff error codes:
**          OUTOFSPACE- log ran out of space
**          ROWNOTFOUND- row is not there in the index | table/index is
**             corrupted.
**    Assumptions:
**    1. Caller must not be holding any latches.
**    2. Caller must have EX locked the data row.
*/
```

To insert a key into an index, the data access layer acquires an EX lock on the data row and calls bt_insert( ). bt_insert( ) calls bt_traverse( ) which traverses the tree and finds the leaf page where the key must be inserted. The traversal returns with the leaf EX latched; the task does not hold any other latches. The leaf page is guaranteed not be undergoing split or shrink. bt_traverse( ) also returns the result of searching in the leaf page: whether the key-value and Record Identifier (ID) or "RID" are found, the slot number (index into the offset table at the end of the page), and the RID position (within a duplicate RID list) where the key must be inserted.

Figure 3:
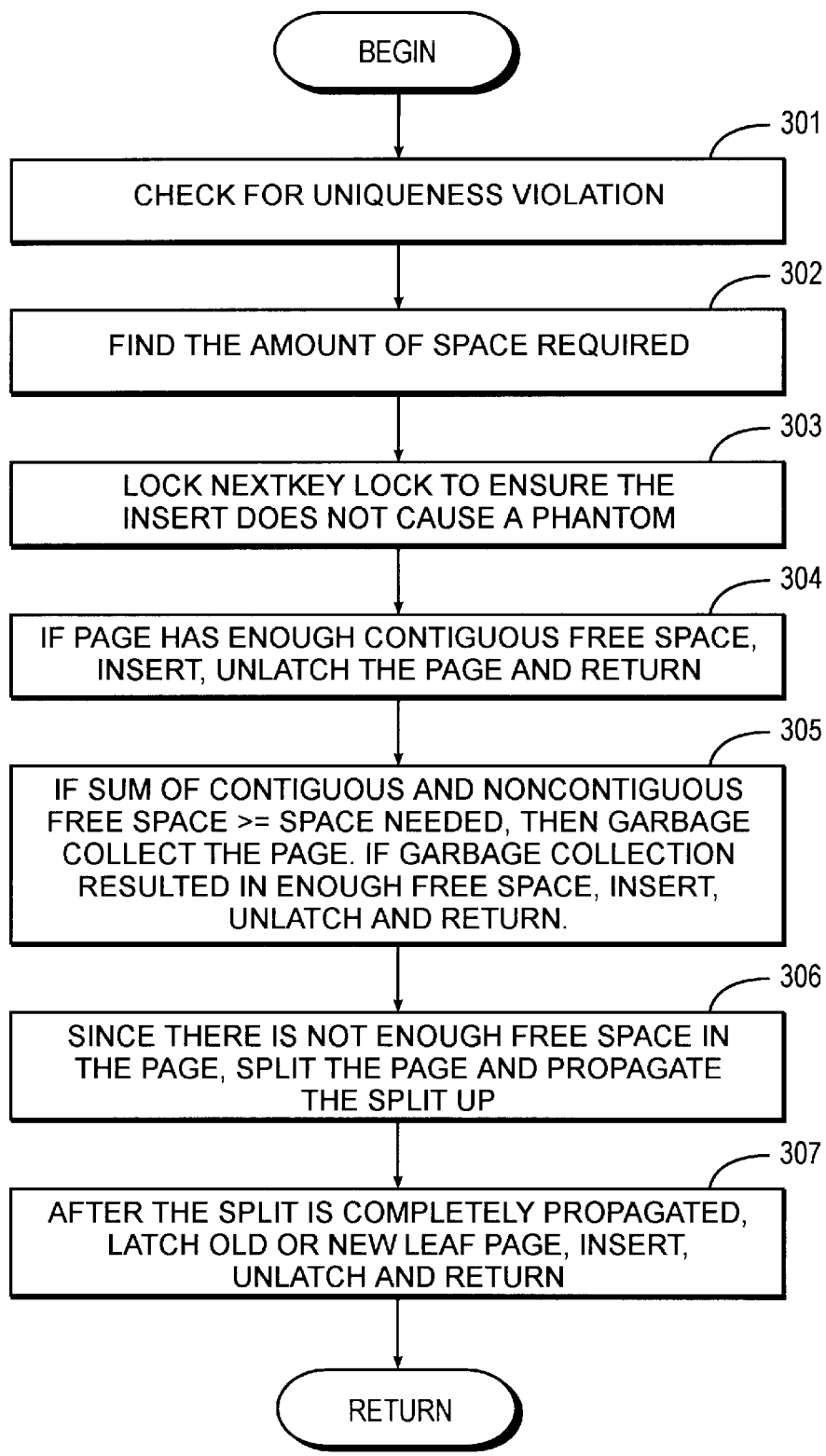
FIG. 3 is a flow chart illustrating an overall method of the present invention for inserting a key (value) into a highly-concurrent data structure, such as a B-Tree.

Given the proper leaf page, the bt_insert function or method performs the following method steps 300 to insert a key, as illustrated in FIG. 3. At step 301, the method checks the key for uniqueness violation, and, at step 302, it finds the amount of space required for insertion. At step 303, the method locks the next-key lock, to ensure the insert does not cause a phantom. If, at step 304, the page has enough contiguous free space, the method inserts the key, unlatches the page, and returns. If, at step 305, the sum of contiguous and noncontiguous free space is greater than or equal to the space needed, the method performs garbage collection on the page. If garbage collection resulted in enough free space, the method inserts the key, unlatches, and returns. Otherwise, not enough free space exists in the page, and the method splits the page and propagate the split up, as indicated at step 306. Finally, after the split is completely propagated, the method latches the old or new leaf page, inserts the key, unlatches, and returns. The discussion which follows focuses on the page splitting aspect of this process.

D. Page splits

1. General

Index page splits and shrinks are done as part of "nested top" actions. A nested top action is nested within a transaction. However, the action itself is a top action, i.e., the action can commit or rollback independent of the parent transaction. Performing splits and shrinks as nested top actions improves concurrency because the pages are address locked only for the duration of the split or the shrink and not for the duration of the parent transaction.

2. Methodology for splitting at the leaf level

Figure 4A:
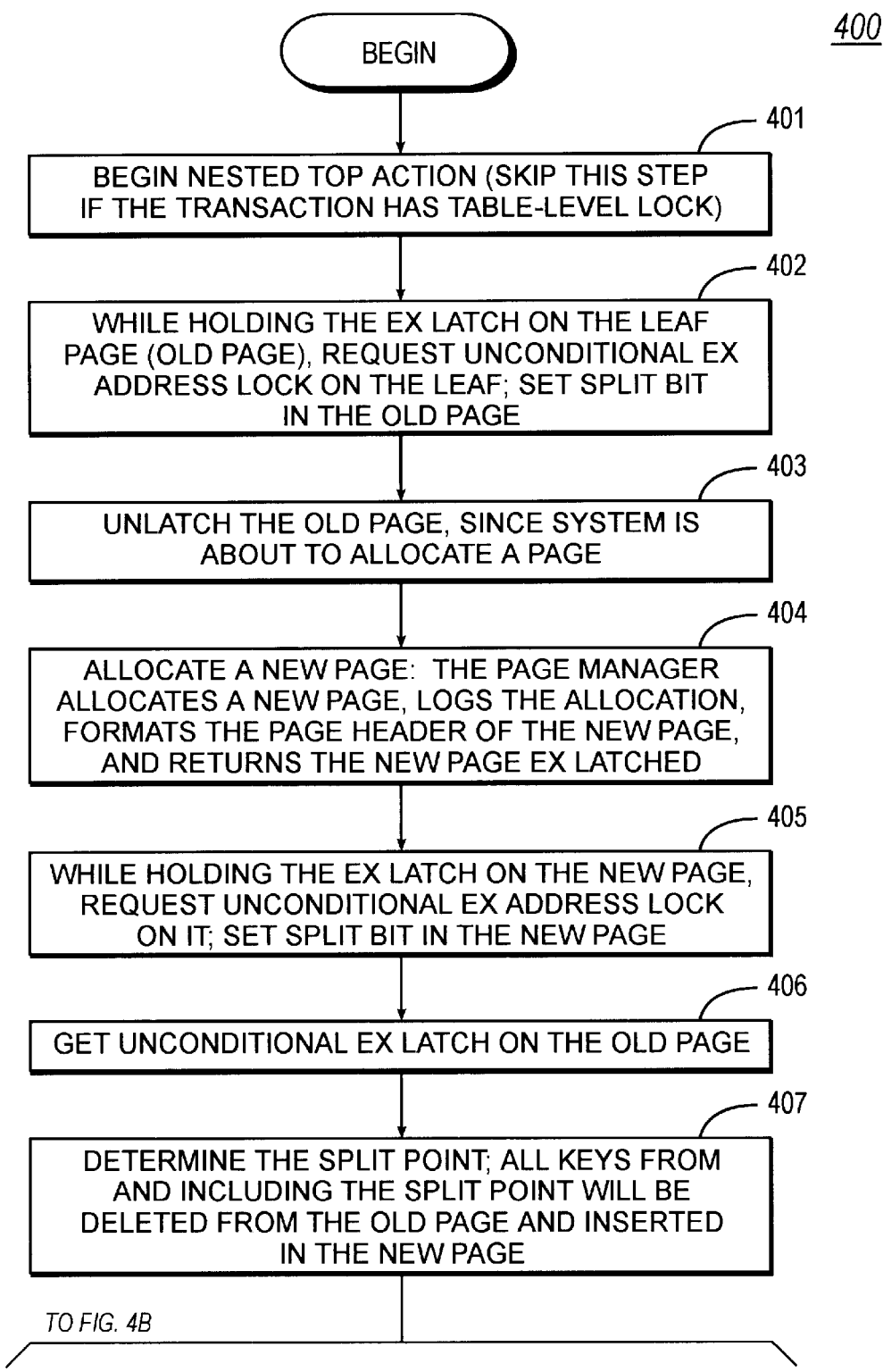
FIGS. 4A–C comprise a flow chart which illustrates a page splitting method of the present invention.
Figure 4B:
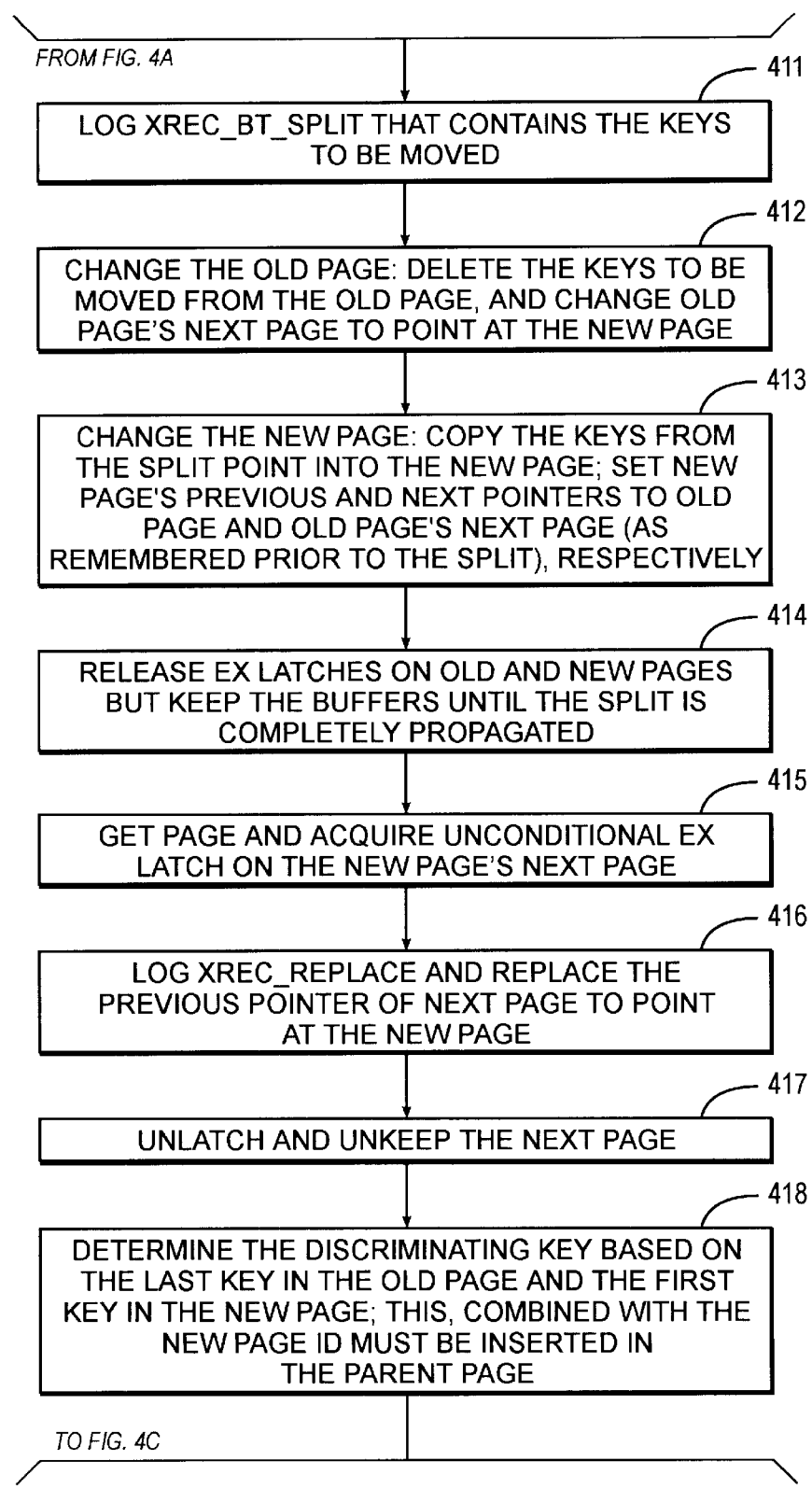
Figure 4C:
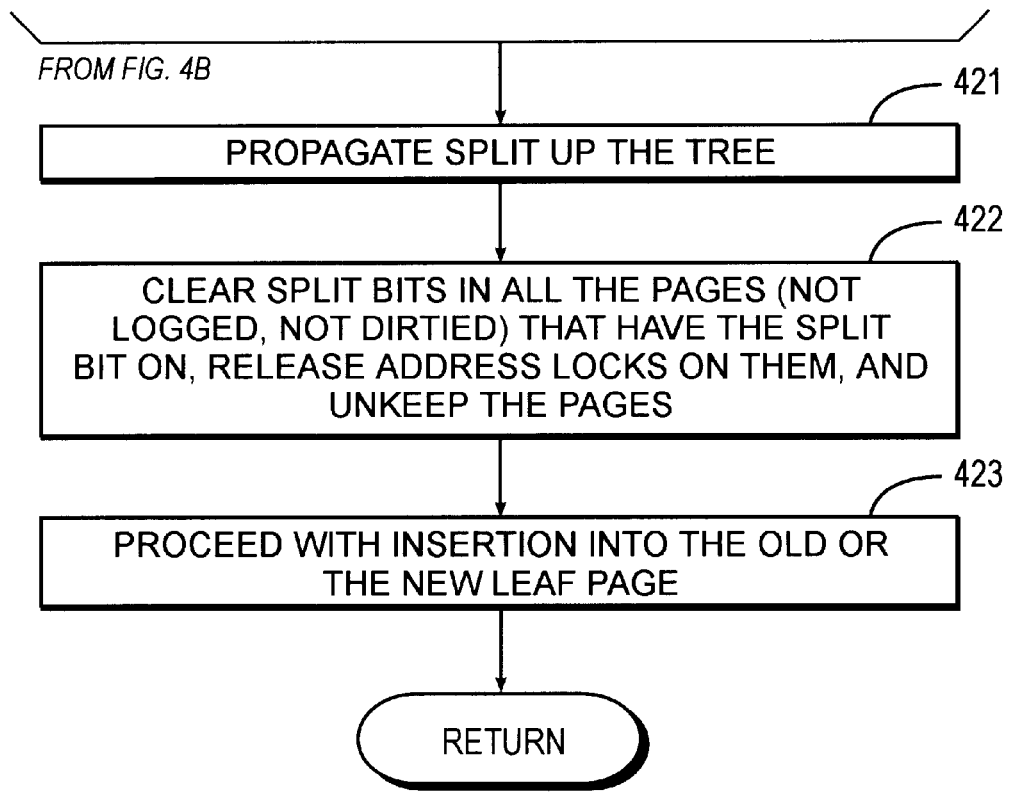

Page split is initiated by an insert when there is insufficient free space to insert the key in a leaf page. The split always begins at the leaf level of the tree and propagates up the tree. FIGS. 4A–C illustrate a page splitting method 400 of the present invention, which comprises the following steps. At step 401, the method begins a nested top action. While holding the EX latch on the leaf page (old page), at step 402, the method requests unconditional EX address lock on the leaf. This will succeed because traversal guaranteed that the page is not undergoing split; even if the splitting task has completed the split but not yet released the address lock, it will release the lock shortly. Also at this step, the split bit is set in the old page (without predirty . . . dirty). Next, at step 403, the method unlatches the old page. Since the system is about to allocate a page (which may take a while), it is better to unlatch the page so that readers can access the page. However, because of the split bit, no other task can insert, delete, split or shrink this page. The only change that another task can do to this page is replace the previous page link.

At step 404, the method allocates a new page. The system's page manager allocates a new page, logs the allocation, formats the page header of the new page, and returns the new page EX latched. Here, the new page's next and previous page pointers are set to NULL. While holding the EX latch on the new page, at step 405, the method requests unconditional EX address lock on it and sets the split bit in the new page (without predirty . . . dirty). At step 406, the method gets an unconditional EX latch on the old page. Then, at step 407, the method determines the split point. All keys from and including the split point will be deleted from the old page and inserted in the new page.

At step 411, the method logs XREC_BT_SPLIT that contains the keys to be moved. At step 412, the old page is changed by deleting the keys to be moved from the old page and changing the old page's next page to point at the new page. The new page is changed at step 413 by copying the keys from the split point into the new page, and setting the new page's previous and next pointers to old page and old page's next page (as remembered prior to the split), respectively. At step 414, the method releases the EX latches on old and new pages but keeps the buffers until the split is completely propagated. At step 415, the method gets the new page and acquire unconditional EX latch on the new page's next page. At step 416, the method logs XREC_REPLACE and replaces the previous pointer of next page to point at the new page. Here, the split bit is not set on the next page, as it is legal for another transaction to be splitting that page. Thus, an update is allowed to the page even if the page is undergoing split, but this update is restricted in the current embodiment to changing the previous page pointer which would not have been changed by this split itself. Only the old and the new pages of a split have the split bit on and not their adjacent pages. At step 417, the method unlatches and "unkeeps" the next page. Next, at step 418, the method determines the discriminating key based on the last key in the old page and the first key in the new page. This, combined with the new page ID, is inserted in the parent page.

The split is propagated up the tree, as indicated at step 421. At step 422, the method clears the split bits in all the pages (not logged, not dirtied) that have the split bit on, releases address locks on them, and unkeeps the pages. One exception, however, is the leaf page where the insert must occur. This page is EX latched before clearing the split bit and is not unkept. Finally, at step 423, the method now proceeds with insertion into the old or the new leaf page.

3. Example of splitting at the leaf level

Figure 5:
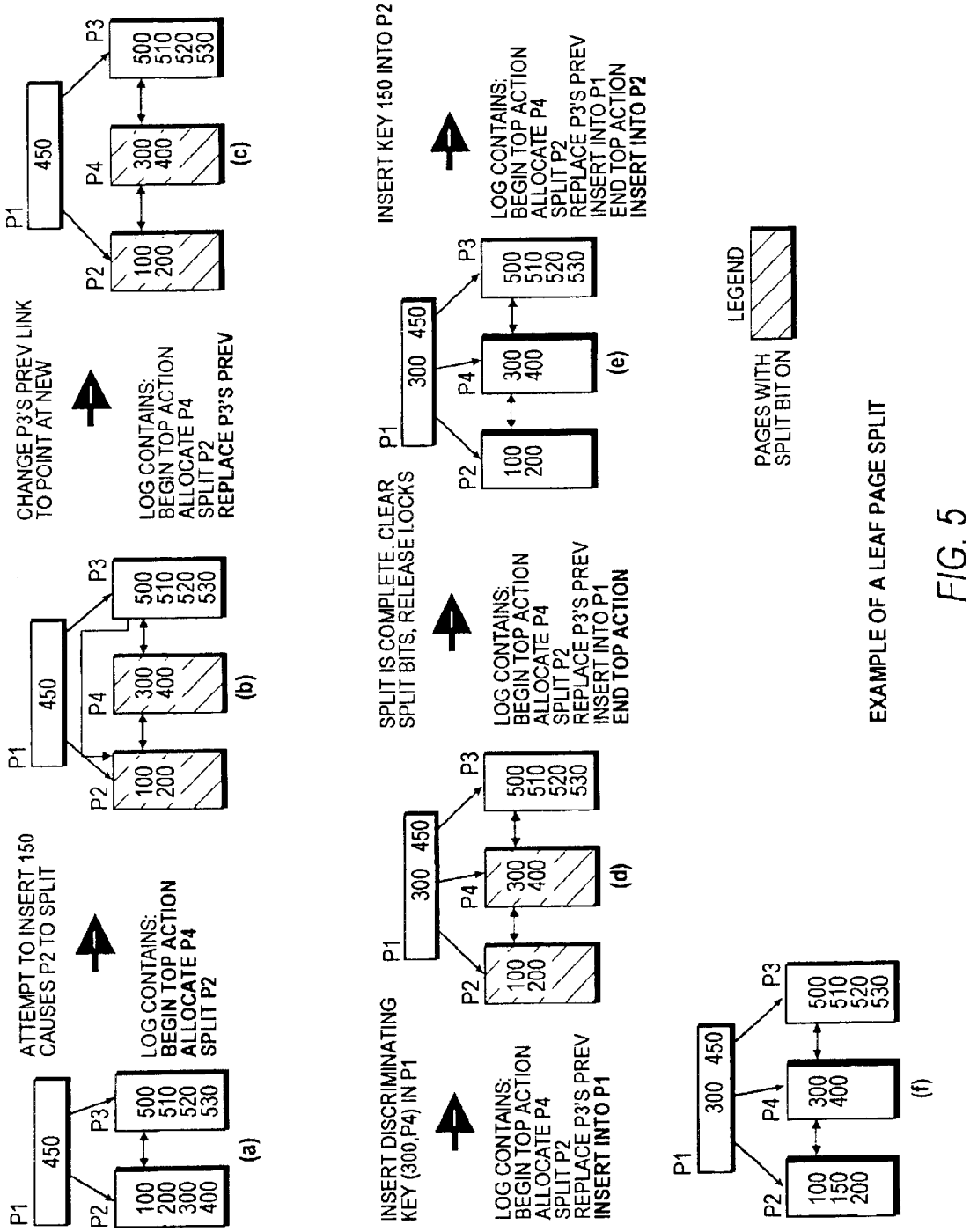
FIG. 5 is a block diagram illustrating the different steps involved in splitting a leaf page.

FIG. 5 illustrates the different steps involved in a leaf page split. For this example, the index is assumed to be unique on an integer column. For brevity, the Record IDs (RIDs) are not shown in the figure. Suppose that a transaction, T1, tries to insert a key with value 150; tree traversal returns page P2, which is EX latched. (It is guaranteed that P2 is not undergoing split or shrink). T1 finds that there is not enough free space in P2 and decides to split P2. The tree looks as shown at (a). T1 starts a nested top action and acquires an unconditional EX address lock on P2. After acquiring the lock, T1 sets the split bit on in the page and unlatches. Setting of the bit is not logged because, if the system crashes, the bit remains set but will get cleared when the tree traversal finds the bit is stale.

Now T1 allocates a new page, P4, which is EX latched. Similar to the old page P2, P4 is address locked and its split bit is turned on. T1 EX latches the old page back. Now, an appropriate split point is chosen. Suppose that the split point is at the key-value 300. T1 moves all keys from and including 300 to the last key in the old page P2 to the split log record. After writing the split log record, the keys in the split log record are deleted from the old page and are added to the new page. The linkages are also set up so that the old page's next page pointer and the new page's previous and next page pointers are properly set up. The side entry bit is turned on in the old page and the latches are released. The tree now appears as shown at (b).

The new page's next page, P3, is unconditionally EX latched, an XREC_REPLACE log record is written to change P3's previous page pointer to point at the new page P4. After changing P3, the page is unlatched and unkept. At this point, the tree looks as shown at (c). Note that the leaf level split is complete, the chain is properly linked, and there are no latches held. Further, note that P3 itself is not marked with the split bit. Given the last key in the old page and the first key in the new page, a discriminating key is formed. This key along with the new page ID are inserted into the parent page. The tree traversal function or method is called to find out the parent page for the newly formed key. In other words, tree traversal is called to find the page at level 1 (i.e., parent of leaf level) to insert the newly formed key.

Tree traversal returns page P1 EX latched. Tree traversal would have found out the right position to insert. Assuming there is enough space in P1, the key is inserted after logging an XREC_BT_INSERT log record. At this point the tree appears as shown at (d). While holding the latch on P1, the top action is completed by writing an XREC_END_TOPACTION log record. Only after writing that log record is P1 unlatched. If T1 had unlatched P1 before writing the log record, another transaction T2 could make changes to P1 (note that P1 does not have split bit on) and commit; and then if T1 rolls back, T2's committed changes will be lost. To prevent that situation, P1 is kept latched until the end top action log record is written. At this point the tree appears as shown at (e) and no latches are held. Since the split is fully propagated up, T1 can clear the split bits and release the address locks. However, before the clearing of the split bit, the leaf page P2 where the insert must occur is EX latched. After releasing the address locks all but that leaf page are unkept. Now T1 inserts the key in P2 by first writing an XREC_BT_INSERT log record and then changing P2. After that, P2 is unlatched and unkept. The insert is complete.

To summarize, in the above example, the following log records are written in order as follows.
1) XREC_BEGINTOPACTION
2) XREC_ALLOC_NOLINK page P4
3) XREC_BT_SPLIT old page P2, new page P4
4) XREC_REPLACE page P3, offset of previous page pointer, old value P2, new value P4
5) XREC_BT_INSERT into non-leaf page P1, key (300, P4)
6) XREC_ENDTOPACTION
7) XREC_BT_INSERT into leaf page P2, key 150

4. Methodology for propagation of the split

Once split at one level is complete, the split is propagated to its parent level. Here, bt_traverse( ) is called to find the page at the next higher level. bt_traverse( ) may use the path remembered while going down the tree to optimally find the page (rather than always starting from the root). In any case, bt_traverse( ) returns the page at the specified level EX latched and guarantees that the page is not undergoing split or shrink.

Figure 6:
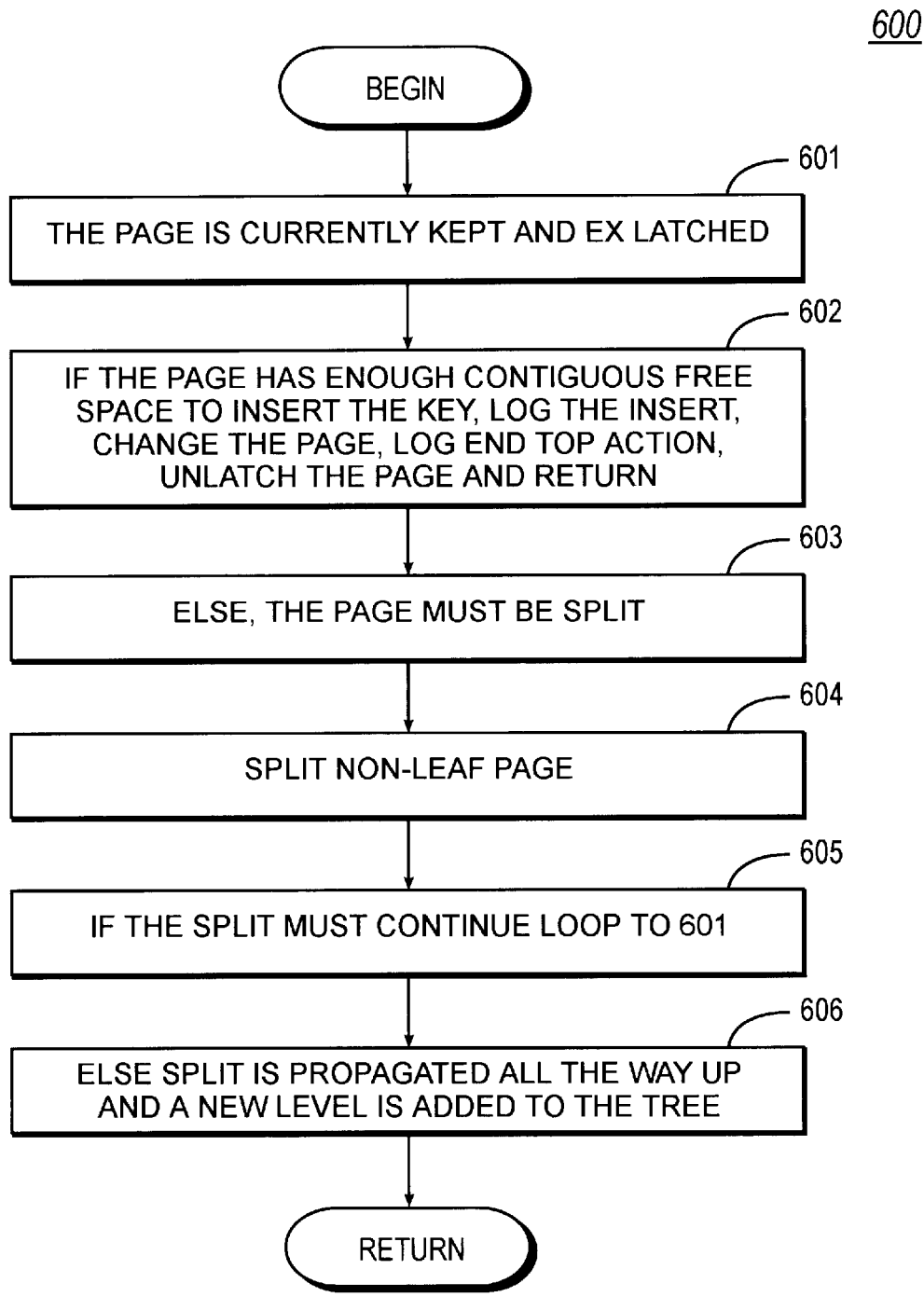
FIG. 6 is flow chart illustrating a methodology of the present invention for propagating a split.

A preferred methodology 600 of the present invention for propagating the split, which is illustrated in FIG. 6, includes the following steps. At step 601, the page is currently kept and EX latched. At step 602, if the page has enough contiguous free space to insert the key, the method proceeds to log the insert, change the page, log "end top action," unlatch the page, and return. Note that the page is latched until the end top action log record is written. This is because the split bit is not set in this page and, hence, one should not make this page available to other transactions until the top action is complete. Otherwise, this page will have multiple transactions' changes.

If the page does not have enough contiguous free space to insert the key (i.e., "else" case), the page must be split, as represented at step 603. The non-leaf page is split, at step 604. If the split must continue, the method loops back to step 601. Otherwise, the split is propagated all the way up and a new level is added to the tree. Thereafter, the method may return.

5. Methodology for splitting a non-leaf page

Splitting a non-leaf page is similar to that of the leaf except for two differences. First, pages are not linked with the neighbors. Second, the key at the split point is not moved to the new page; it remains in the old page as the side entry. Only the child page pointer is moved to the new page and that becomes the leftmost child of the new page. Otherwise, the basic methodology is the same as splitting a leaf page.

6. Example of splitting at the non-leaf level

FIG. 7 highlights the different steps involved in a non-leaf page split. Attempt to insert key value 525 into leaf page P4 causes a page split. Split at the leaf level has been previously described above and hence is not repeated. After splitting at the leaf level, the tree appears as shown in (b). At this time, no latches are held. The key to be inserted into the parent is formed as (520, P7).

The bt_traverse( ) function is called to find the page at level 1 to insert (520, P7); it returns P2 EX latched. Since there is not enough space in P2, T1 decides to split that page. T1 allocates a new page P8 (EX latched). The split point is determined. For this example, suppose that it is at key-value 540. An XREC_BT_SPLIT log record is written (to move keys starting from 540, including 540) is written. All keys from 540, but not including 540, are moved to the new page P8. The child page pointer associated with the key-value 540 is stored as the leftmost child in the new page. Note that there is no key associated with the leftmost child; that is the reason key-value 540 is not moved to the new page. The moved keys are removed from the old page.

The key at the split point is made a side entry in the old page. The page pointer in the side entry is changed to point at the new page. This is done so that if traversal by another transaction comes to this page before the split is propagated up, the side entry can be used to determine if the new page must be traversed rather than the old page. The side entry bit is set in the old page. At this time, the tree appears as shown in (c). Depending on the position of the split point, the key is inserted into either the old or the new page (for this example, in old page P2). This is done after logging an XREC_BT_INSERT log record. Then both old and new pages are unlatched. Now the split at this level is complete and the tree appears as shown in (d). The side entry from the old page should be propagated up. Therefore, bt_traverse( ) is called to find and EX latch the page at the parent level. Assuming there is enough space in that page P1, the key is inserted after logging an XREC_BT_INSERT and the tree appears as shown in (e).

Now the split is complete, an end top action log record is written (while holding the latch on P1. Then P1 is unlatched and unkept. All the pages that have the split bit on are cleared and the address locks are released with one exception: the leaf page where the insert must occur is EX latched before clearing the split bit. The leaf key is inserted into the leaf page and the insert is complete.

To summarize the foregoing, the following log records are written in order as follows.
1) XREC_BEGINTOPACTION
2) XREC_ALLOC_NOLINK page P7
3) XREC_BT_SPLIT, leaf-level—old page P4, new page P7
4) XREC_REPLACE, page P5, offset of previous page pointer, old value P3, new value P7
5) XREC_ALLOC_NOLINK page P8

6) XREC_BT_SPLIT, non-leaf level—old page P2, new page P8
7) XREC_BT_INSERT, non-leaf level—page P2, key (520, P7)
8) XREC_BT_INSERT, non-leaf level—page P1, key (540, P8)
9) XREC_ENDTOPACTION
10) XREC_BT_INSERT leaf level—page P7, key 525

7. Methodology for adding a level to the index

When the root page does not have enough space to insert an entry, the root page must be split. This is similar to the splitting of any non-leaf page as described above. After splitting the root page, the side entry must be propagated up. Since there is no higher level to propagate up, however, the tree must be grown in height.

Figure 8A:
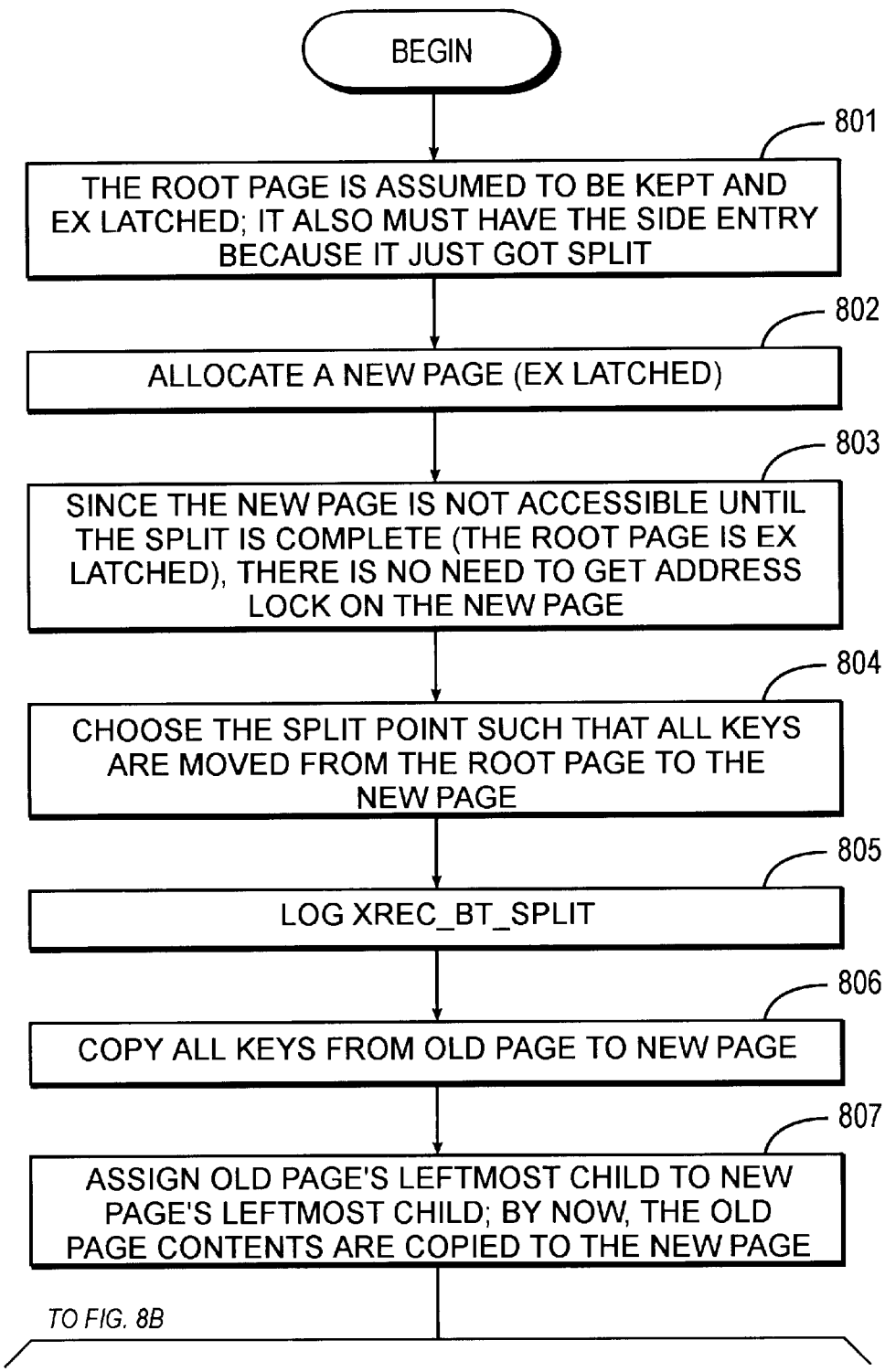
FIGS. 8A–B illustrate a methodology of the present invention for adding a new level to the tree by performing another split of the root page.
Figure 8B:
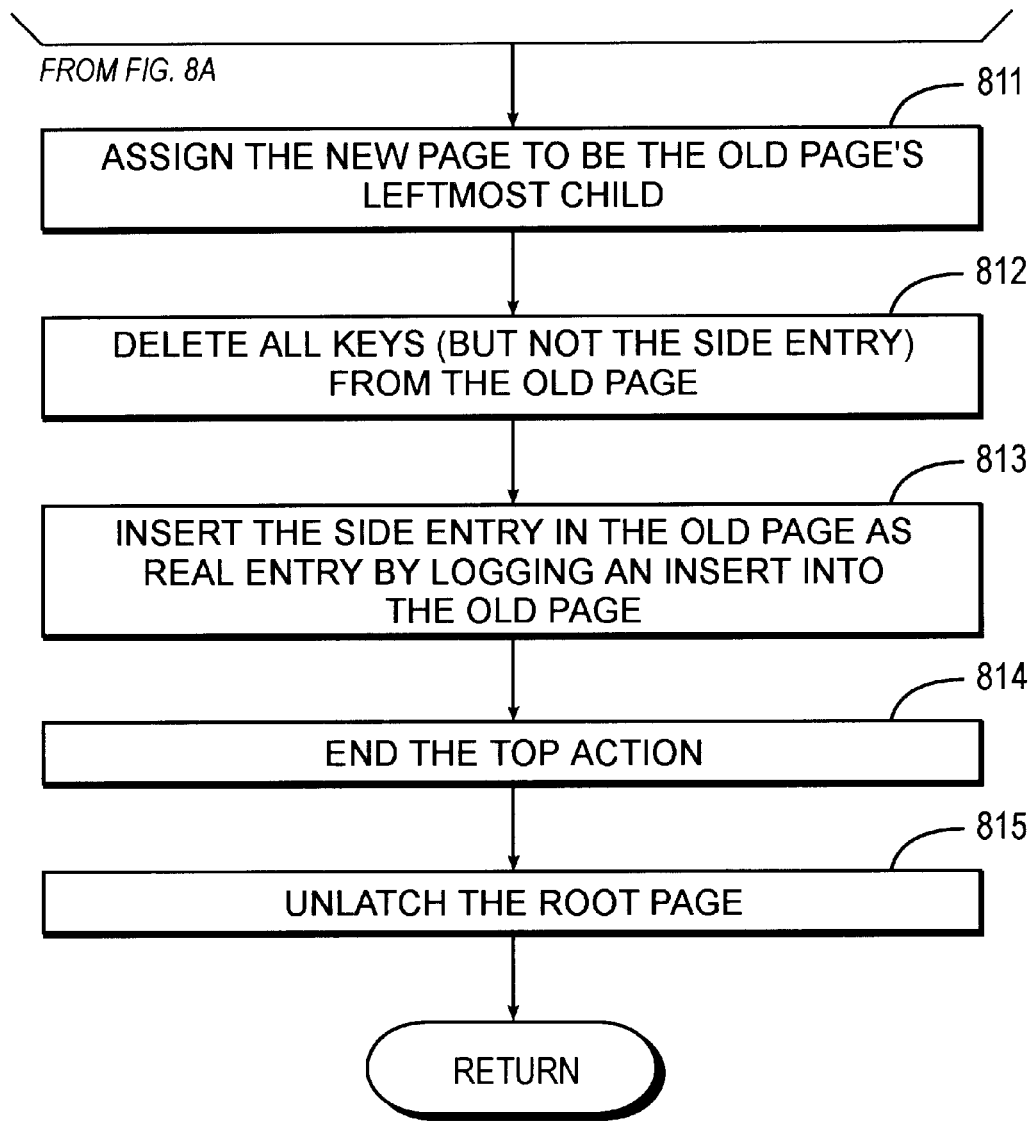

FIGS. 8A–B illustrate a preferred methodology 800 for adding a new level to the tree by performing another split of the root page. The steps of the method are as follows. At step 801, the root page is assumed to be kept and EX latched; it also must have the side entry because it just got split. At step 802, the method allocates a new page (EX latched). Since the new page is not accessible until the split is complete (the root page is EX latched), there is no need to get address lock on the new page, as indicated at step 803. At step 804, the method chooses the split point such that all keys are moved from the root page to the new page. It is not necessary to move all the keys but it makes it simpler because the system does not have to find a split point. An XREC_BT_SPLIT log record is recorded, at step 805. Now, at step 806, the method copies all keys from the old page to the new page; there is no need to copy the side entry because tree is not accessible to any other transaction. At step 807, the old page's leftmost child is assigned to the new page's leftmost child. By now, the old page contents are copied to the new page.

The method assigns the new page to be the old page's leftmost child, at step 811, and delete all keys (but not the side entry) from the old page, at step 812. Next, at step 813, the method inserts the side entry in the old page as real entry, by logging an insert into the old page. The method concludes by ending the top action, at step 814, and unlatching the root page, at step 815. Note that the root page id remains unchanged.

8. Example for adding a level to the index

Figure 9:
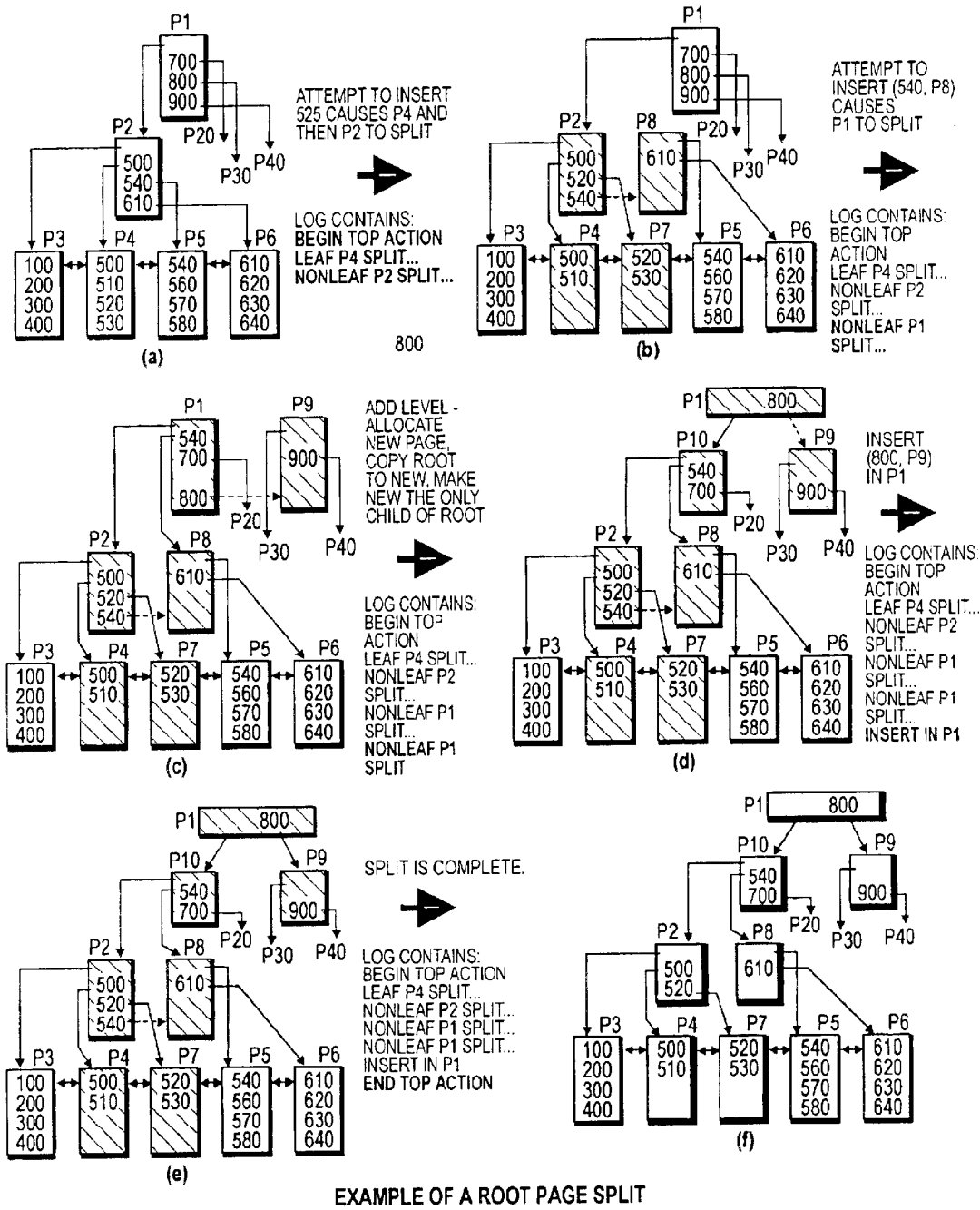
FIG. 9 is a block diagram illustrating the steps involved in the split of a root node or page.

FIG. 9 illustrates the steps involved in the split of a root page. An attempt to insert key-value 525 results in splitting leaf page P4 and then non-leaf page P2. The tree appears as shown at (b). Inserting key (540, P8) in the root page P1 causes it to split. This split is performed similar to a non-leaf page split; 800 is chosen as the split point. The tree now appears at (c), with (800, P9) as the side entry. The leaf and non-leaf page splits have already been described above and, hence, are not repeated.

To add a level to the tree, a new page P10 is allocated and all entries except the side entry are moved from the old page to the new page; the new page is made the leftmost child of the old page. The new page P10 is unlatched. At this point, the tree appears as shown at (d). Note that the side entry in the old page points to the other page P9, which is the sibling of the newly allocated P10. The side entry in the old page is logged and inserted into the old page as a real entry. This is the only key in the root page (and hence the root has exactly two child page pointers). Now the tree appears as shown at (e). Since the split propagation is complete, an end top action is written, then the latch on the root page is released. The key-value 525 is now inserted at the leaf level.

To summarize, in the above example, the following log records are written in order.

1) XREC_BEGINTOPACTION
2) XREC_ALLOC_NOLINK page P7
3) XREC_BT_SPLIT leaf level—old page P4, new page P7
4) XREC_REPLACE page P5, offset of previous page pointer, old value P3, new value P7
5) XREC_ALLOC_NOLINK page P8
6) XREC_BT_SPLIT, non-leaf level—old page P2, new page P8
7) XREC_PT_INSERT, non-leaf level-page P2, key (520, P7)
8) XREC_ALLOC_NOLINK, page P9
9) XREC_BT_SPLIT non-leaf level—old page P1, new page P9
10) XREC_BT_INSERT, non-leaf level—page P1, key (540, P8)
11) XREC_BT_SPLIT, non-leaf level—old page P1, new page P10
12) XREC_BT_INSERT, non-leaf level—page P1, key (800, P9)
13) XREC_ENDTOPACTION While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a database system, said database system storing a plurality of data records as a data table having an index, said index comprising a B-Tree having a root page, a plurality of internal pages, and a plurality of leaf-level pages, each page storing one or more key values from said data records, a method for providing highly-concurrent access to the B-Tree for multiple clients, the method comprising:

(a) receiving a request from a client which requires insertion of a new key value into the B-Tree in order to satisfy the request;

(b) traversing the B-Tree for locating an existing page in the B-Tree appropriate for storing the new key value; and (c) if said existing page does not contain sufficient room for storing the new key value, splitting the existing page into two pages by:

(i) allocating a new page at a level in the B-Tree which is the same as the existing page and marking both pages as undergoing a split, (ii) moving some of the key values from the existing page to the new page, and (iii) creating a reference in the existing page which points to the new page, so that any client which is traversing the B-Tree will not be blocked by the split which is currently occurring.

2. The method of claim 1, wherein any other client which is traversing the B-Tree while the split is occurring, in search of a key value which is greater than that stored by the existing page, will traverse to the new page before traversing to an appropriate lower-level page in the B-Tree for arriving at a proper leaf-level page.

3. The method of claim 1, further comprising:

(d) storing the new key value in the B-Tree and, thereafter, marking both pages as no longer undergoing a split and clearing the reference in the existing page which points to the new page.

4. The method of claim 1, wherein any client which is traversing the B-Tree while the split is occurring, in search of a key value which is less than that stored by the existing page, will traverse directly to an appropriate lower-level page in the B-Tree, for arriving at a proper leaf-level page.

5. The method of claim 1, wherein said split occurs at a point which is at mid point for the page.

6. The method of claim 1, wherein each page includes a corresponding split flag for indicating whether the page is currently undergoing a split.

7. The method of claim 1, wherein each split flag comprises a bit flag which is set when the corresponding page is undergoing a split and reset upon completion of the split.

8. The method of claim 1, wherein the existing page has a parent page and wherein the method further comprises:

propagating the split upward to a next-higher level of the B-Tree, so that the parent of the existing page adds appropriate new key value information for allowing clients to traverse to the new page when appropriate.

9. The method of claim 8, further comprising:

if the parent of the existing page does not contain sufficient room for storing new key value information, further propagating the split upward through the B-Tree.

10. The method of claim 1, wherein said reference created in the existing page comprises a side-entry bit which is set in the existing page for indicating whether a side-entry exists in the page, said side-entry allowing a client traversing the B-Tree to check whether to traverse to the new page.

11. The method of claim 1, wherein said split is performed within a database transaction.

12. The method of claim 1, wherein said split is performed as a nested top action within a particular database transaction, such that the action can commit or rollback independent of the particular database transaction.

13. The method of claim 1, wherein said step of splitting the page into two pages includes:

asserting an address lock on a page while the page is undergoing a split.

14. The method of claim 1, wherein said other clients which are traversing the B-Tree at a page which is currently undergoing a split are restricted to read-only access.

15. The method of claim 1, wherein said index is a clustered index, and wherein said leaf-level pages of said B-Tree actually store said plurality of data records.

16. The method of claim 1, wherein said leaf-level pages of said B-Tree store identifier information allowing the system to uniquely identify a particular one of said data records.

17. The method of claim 1, further comprising:

inserting the new key value into the B-Tree by storing the new key value in the existing page once sufficient room for storing the new key value has been made available.

18. The method of claim 1, wherein said step of splitting includes:

determining a mid point in the existing page;

creating the new page by splitting the existing page into two pages; and transferring to the new page key values which were stored in the existing page beyond the determined mid point.

19. The method of claim 1, wherein each page stores one or more key values together with pointers to children pages, said pointers indicating which path a client should traverse through the B-Tree to identify a record whose particular key value is being sought.

20. The method of claim 1, wherein said request from the client comprises a request to insert a new data record into the data table.

21. A data processing system comprising:

a database server connected to a plurality of clients, said database server storing a B-Tree data structure comprising a plurality of pages storing key values derived from a database table;

means for receiving a request from a first client to insert a new data record into said database table;

means for inserting a new key value from the new data record into an existing page of said B-Tree, said means including means for splitting the existing page into the existing page and a new page, said new page being at a level in the B-Tree which is the same as the existing page, so that insertion of the new key value may be accommodated; and means for preserving concurrent access by creating an entry in the existing page which points to the new page, so that any other client which is traversing the B-Tree at the point of the split will not be blocked by the split while it is occurring, said means including a side-entry storing a key value allowing a client traversing the B-Tree to determine whether to traverse to the new page.

22. The system of claim 21, wherein said request from the first client to insert a new data record comprises an SQL statement received from the first client.

23. The system of claim 21, wherein any other client which is traversing the B-Tree while the split is occurring, in search of a key value which is greater than that stored by the existing page, will traverse to the new page before traversing to an appropriate lower-level page in the B-Tree for arriving at a proper leaf-level page.

24. The system of claim 21, wherein said means for preserving concurrent access includes:

means for marking both pages as undergoing a split.

25. The system of claim 21, wherein any client which is traversing the B-Tree while the split is occurring, in search of a key value which is less than that stored by the existing page, will traverse directly to an appropriate lower-level page in the B-Tree for arriving at a proper leaf-level page.

26. The system of claim 21, wherein said split occurs at a point which is at mid point for the page.

27. The system of claim 21, wherein each page includes a corresponding split flag for indicating whether the page is undergoing a split.

28. The system of claim 21, wherein each split flag comprises a bit flag which is set when the corresponding page is undergoing a split and reset upon completion of the split.

29. The system of claim 21, wherein the existing page has a parent page and wherein said means for preserving concurrent access includes:

means for propagating the split upward to a next-higher level of the B-Tree, so that the parent of the existing page adds appropriate new key value information for allowing clients to traverse to the new page when appropriate.

30. The system of claim 21, wherein said entry created in the existing page comprises a side-entry and a corresponding side-entry bit, said side-entry bit being set in the existing page for indicating whether a side-entry exists in the page, said side-entry storing a key value allowing a client traversing the B-Tree to determine whether to traverse to the new page.

\* \* \* \* \*